US011146992B2

(12) United States Patent
Mattam et al.

(10) Patent No.: US 11,146,992 B2
(45) Date of Patent: Oct. 12, 2021

(54) METHOD AND APPARATUS FOR HANDLING UPLINK BEARER SPLIT CONFIGURATION IN MULTI-CONNECTIVITY SYSTEM

(71) Applicant: Samsung Electronics Co., Ltd., Gyeonggi-do (KR)

(72) Inventors: Jajohn Mathew Mattam, Bangalore (IN); Fasil Abdul Latheef, Bangalore (IN); Manasi Ekkundi, Bangalore (IN)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 16/800,792

(22) Filed: Feb. 25, 2020

(65) Prior Publication Data

US 2020/0275314 A1    Aug. 27, 2020

(30) Foreign Application Priority Data

Feb. 25, 2019   (IN) ............................. 201941007324
Feb. 19, 2020   (IN) ............................. 201941007324

(51) Int. Cl.
*H04W 28/08*    (2009.01)
*H04W 76/15*    (2018.01)
*H04W 80/02*    (2009.01)

(52) U.S. Cl.
CPC ......... *H04W 28/085* (2013.01); *H04W 76/15* (2018.02); *H04W 80/02* (2013.01)

(58) Field of Classification Search
CPC ..... H04L 43/0888; H04L 43/04; H04L 43/16; H04L 47/34; H04L 45/16; H04L 1/1874;
(Continued)

(56) References Cited

U.S. PATENT DOCUMENTS

| 2016/0065439 A1* | 3/2016 | Bi ........................... H04L 43/16 370/252 |
| 2017/0013565 A1* | 1/2017 | Pelletier .............. H04W 52/365 |

(Continued)

OTHER PUBLICATIONS

ZTE, "Considerations on PDCP Duplication and Routing for NR-U", R2-1816840, 3GPP TSG RAN WG2 NR #104 Meeting, Nov. 12-16, 2018, 2 pages.

(Continued)

*Primary Examiner* — Jung Liu
(74) *Attorney, Agent, or Firm* — The Farrell Law Firm, P.C.

(57) ABSTRACT

Method handling uplink (UL) bearer split configuration in multi-connectivity system includes identifying first UL data of a packet data convergence protocol (PDCP) layer, transmitting first data of first UL data to a primary radio link control (RLC) entity for a first time period, and transmitting second data of the first UL data to a secondary RLC entity for a second time period, identifying at least one first network parameter of a first UL path associated with the primary RLC entity for the first time period, and identifying at least one second network parameter of a second UL path associated with the secondary RLC entity for the second time period, determining a split factor for splitting second UL data of the PDCP layer between the primary RLC entity and the secondary RLC entity based on the at least one first network parameter and the at least one second network parameter, and transmitting the second UL data to the primary and secondary RLC entities for a third time period based on the split factor.

18 Claims, 6 Drawing Sheets

(58) Field of Classification Search
CPC . H04L 1/1896; H04L 1/1841; H04L 43/0829; H04L 1/188; H04L 47/566; H04L 47/30; H04L 47/24; H04B 7/024; H04B 7/0417; H04W 24/08; H04W 28/0278; H04W 88/06; H04W 72/1215; H04W 28/08
See application file for complete search history.

(56) References Cited

U.S. PATENT DOCUMENTS

| | | | |
|---|---|---|---|
| 2017/0374579 A1* | 12/2017 | Wang | H04W 28/0278 |
| 2019/0028935 A1* | 1/2019 | Cai | H04W 72/1284 |
| 2019/0132897 A1 | 5/2019 | Pradas et al. | |

OTHER PUBLICATIONS

Huawei, HiSilicon, "A Hybrid UL Split Operation", R2-1705157, 3GPP TSG RAN WG2 Meeting #98, May 15-19, 2017, 2 pages.
Sequans Communications, "Threshold for NR UL Data Split Operation", R2-1707364, 3GPP TSG-RAN WG2 NR AdHoc, Jun. 27-29, 2017, 5 pages.
International Search Report dated Jun. 3, 2020 issued in counterpart application No. PCT/KR2020/002674, 8 pages.

\* cited by examiner

METHOD AND APPARATUS FOR HANDLING UPLINK BEARER SPLIT CONFIGURATION IN MULTI-CONNECTIVITY SYSTEM

CROSS-REFERENCE TO RELATED APPLICATION(S)

This application is based on and claims priority under 35 U.S.C. § 119(a) to Indian Provisional Patent Application Serial No. 201941007324 (PS), filed on Feb. 25, 2019 in the Indian Intellectual Property Office, and Indian Complete Patent Application Serial No. 201941007324 (CS), filed on Feb. 19, 2020 in the Indian Intellectual Property Office, the disclosure of each of which is incorporated by reference herein in its entirety.

BACKGROUND

1. Field

The disclosure relates to communication technology, and more particularly, to a method and a system for handling an uplink bearer split configuration in a multi-connectivity system.

2. Description of Related Art

As per the current third generation partnership project (3GPP) specification, a device may be configured with dual connectivity i.e., with a single packet data convergence protocol (PDCP) entity and two associated radio link control (RLC) entities (i.e. a primary RLC entity and a secondary RLC entity) belonging to a different cell group. If PDCP duplication is activated, then the system duplicates the PDCP data protocol data unit (PDU) and transmits the PDCP data PDU to both associated RLC entities. Otherwise, if the PDCP split is configured and if the total amount of PDCP data volume and the RLC data volume pending for transmission is greater than or equal to an uplink (UL) data split threshold (i.e., ul-DataSplitThreshold), then the system submits the PDCP PDU to either the primary RLC entity or the secondary RLC entity, or submits the PDCP PDU to only the primary RLC entity.

Conventionally, there is no specification defined mechanism for splitting data between the primary RLC entity and the secondary RLC entity. It is up to the user equipment (UE) implementation to decide the amount of data which must be transmitted over primary and secondary RLC circuits. For example, if there is no proper split of data between the primary RLC entity and the secondary RLC entity, either the UL throughput is reduced or there is an inefficient UL resource utilization. In new radio (NR), to achieve an increased data rate, there is an option of pre-processing the data at RLC even before the UL grants are received. In this case, the PDCP transmit entity does not wait for the UL grants to be received and also does not wait to decide which packets should be associated to the RLC entities. The primary RLC entity and the secondary RLC entity may process these packets and may provide the processed packets to lower layers for further processing even before a lower layer indicates the presence of uplink grants for transmission. Thus, when the pre-processing is applied, the PDCP may immediately split the packets and will forward the split packets to the lower layers for pre-processing. If the split of data is not properly performed by the PDCP, there may be a data stall at the receiver side depending on the condition of each of the primary RLC entity and the secondary RLC entity.

One method to split data is equally splitting the data between a primary RLC entity and a secondary RLC entity. When PDCP activation is triggered and if the pending data is greater than that of the ul-DataSplitThreshold, then the system splits the pending data equally and the pending data flows from the PDCP to the primary RLC entity and the secondary RLC entity. The system splits the pending data equally such that 50% of the data flows to the primary RLC entity and the remaining 50% of the data flows to the secondary RLC entity. This method works well when both the primary RLC entity and the secondary RLC entity have the same conditions. When a condition in any one of the primary RLC entity and the secondary RLC entity is poor, this method does not perform well and results in a data stall at the receiver side.

A second method to split data is splitting the data as per the ul-DataSplitThreshold. If the pending data is greater than or equal to the ul-DataSplitThreshold, then the PDCP transmits the data (i.e., equal to the ul-DataSplitThreshold) in the primary RLC entity and the remaining data in the secondary RLC entity. This method works well when the primary RLC entity is in good condition. When the condition of the primary RLC entity is poor, this method will not perform well and results in a data stall at the receiver side.

The present disclosure overcomes the aforesaid issues of splitting data between a primary RLC entity and a secondary RLC entity.

SUMMARY

An aspect of the present disclosure provides a method and a terminal for handling a UL bearer split configuration in a multi-connectivity system.

In accordance with an aspect of the disclosure, a method for handling an UL bearer split configuration in a multi-connectivity system is provided. The method includes identifying, by a mobile terminal, first UL data of a PDCP layer, transmitting, by the mobile terminal, first data of the first UL data to a primary RLC entity for a first time period, and transmitting second data of the first UL data to a secondary RLC entity for a second time period, identifying, by the mobile terminal, at least one first network parameter of a first UL path associated with the primary RLC entity for the first time period, and identifying at least one second network parameter of a second UL path associated with the secondary RLC entity for the second time period, determining, by the mobile terminal, a split factor for splitting a second UL data of the PDCP layer between the primary RLC entity and the secondary RLC entity based on the at least one first network parameter and the at least one second network parameter, and transmitting, by the mobile terminal, the second UL data to the primary RLC entity and the secondary RLC entity for a third time period based on the split factor.

In accordance with another aspect of the disclosure, a mobile terminal for handling a UL bearer split configuration in a multi-connectivity system is provided. The mobile terminal includes a transceiver, at least one processor, and a memory communicatively coupled to the at least one processor, wherein the memory is configured to store processor-executable instructions, which, when executed, cause the at least one processor to identify first UL data of a PDCP layer, control the transceiver to transmit first data of the first UL data to a primary RLC entity for a first time period, and to transmit second data of the first UL data to a secondary RLC entity for a second time period, identify at least one first network parameter of a first UL path associated with the primary RLC entity for the first time period, and identify at least one second network parameter of a second UL path associated with the secondary RLC entity for the second time period, determine a split factor for splitting a second UL data of the PDCP layer between the primary RLC entity and the secondary RLC entity based on the at least one first network parameter and the at least one second network parameter, and control the transceiver to transmit the second UL data to the primary RLC entity and the secondary RLC entity for a third time period based on the split factor.

In accordance with another aspect of the disclosure, a non-transitory computer readable medium including instructions stored thereon which, when processed by at least one processor, cause a mobile terminal to perform a method is provided. The method includes identifying first UL data of a PDCP layer, transmitting first data of the first UL data to a primary RLC entity for a first time period, and transmitting second data of the first UL data to a secondary RLC entity for a second time period, identifying at least one first network parameter of a first UL path associated with the primary RLC entity for the first time period, and identifying at least one second network parameter of a second UL path associated with the secondary RLC entity for the second time period, determining a split factor for splitting second UL data of the PDCP layer between the primary RLC entity and the secondary RLC entity based on the at least one first network parameter and the at least one second network parameter, and transmitting the second UL data to the primary RLC entity and the secondary RLC entity for a third time period based on the split factor.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
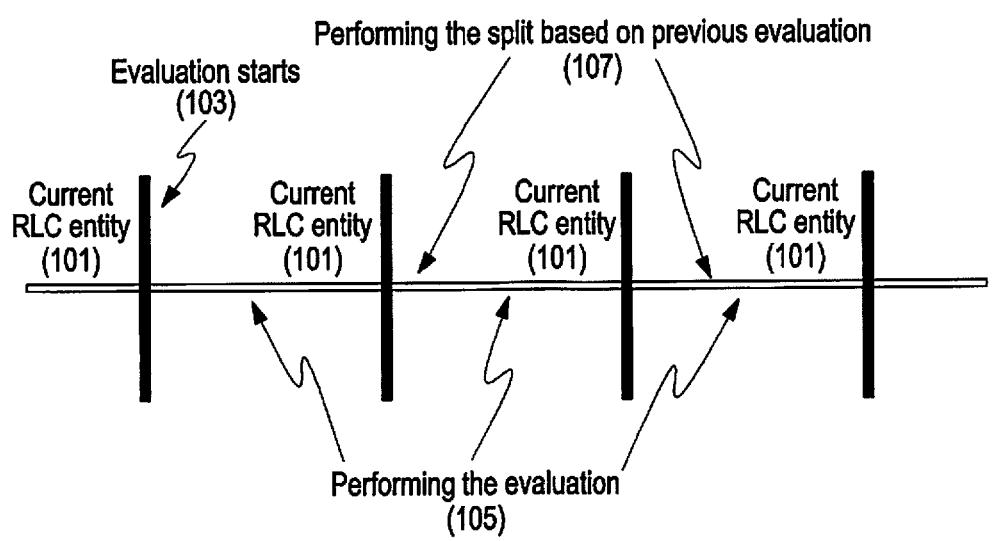
FIG. 1 illustrates a system for evaluating a primary RLC entity and a secondary RLC entity using a previous evaluation, in accordance with an embodiment.

In the present disclosure, the word "exemplary" may be used herein to indicate "serving as an example, instance, or illustration." Any embodiment or implementation of the present disclosure described herein as "exemplary" is not necessarily to be construed as preferred or advantageous over other embodiments.

While the disclosure is susceptible to various modifications and alternative forms, certain embodiments thereof are shown by way of example in the accompanying drawings and are described in detail below. It should be understood, however, that it is not intended to limit the disclosure to the particular forms disclosed, but, on the contrary, the disclosure is intended to cover all modifications, equivalents, and alternatives falling within the scope of the present disclosure as defined by the appended claims and their equivalents.

The terms "comprises", "comprising", and any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the disclosure, reference is made to the accompanying drawings that form a part hereof, and in which are shown by way of illustration certain embodiments in which the present disclosure may be practiced. These embodiments are described in sufficient detail to enable those skilled in the art to practice the disclosure, and it is to be understood that other embodiments may be utilized and that changes may be made without departing from the scope of the present disclosure as defined by the appended claims and their equivalents. The following description is, therefore, not to be taken in a limiting sense.

In the present disclosure, a method and a system for splitting data based on an evaluation is presented. The system evaluates a condition of both a primary and a secondary RLC entity for a certain period and finds an efficiency that may be achieved for that period. In a subsequent step, the system evaluates the primary and the secondary RLC entities based on a previous evaluation. At an evaluation point, the system uses all the parameters from the previous evaluation window and splits the data accordingly between the primary and the secondary RLC entities, until the next evaluation point. Initially, when data available for transmission at PDCP is greater than the UL data split threshold during a current evaluation period, the PDCP sends all the data over the primary RLC entity, until the threshold is met. Once the threshold is met, the PDCP submits all PDUs to the secondary RLC entity in order to have an initial evaluation result available, which is later used to filter the evaluation result performed during the evaluation period. The PDCP performs periodic evaluation of channels on both the uplink paths (e.g., RLC entities) based on certain parameters and splits the data between primary and secondary RLC entities based on the evaluation.

In an embodiment, the system checks if the total amount of PDCP data volume and the RLC data volume pending for a transmission is greater than a ul-DataSplitThreshold. The ul-DataSplitThreshold is a threshold set by a network for UL data. When this threshold is met, the system may split the data in a UL. Until then, the system will transmit using the primary RLC entity only. The network may configure different values for the ul-DataSplitThreshold ranging from 0 to infinity. Here, infinity indicates that the entire data will be sent only using the primary RLC entity. If the total amount of PDCP data volume and the RLC data volume pending for the transmission is greater than the ul-DataSplitThreshold, then the system transmits (e.g, pushes) all the pending data in the PDCP over the secondary RLC entity for t/2 duration, where "t" is the evaluation period. After the t/2 duration, the evaluation is started.

The present disclosure overcomes the problems associated with splitting data (1) when a condition in any one of a primary RLC entity and a secondary RLC entity is poor in case of equally splitting the data between the primary RLC entity and the secondary RLC entity and (2) when the primary entity is poor in case of splitting the data as per a ul-DataSplitThreshold i.e., if the pending data is greater than or equal to the ul-DataSplitThreshold, then the PDCP transmits the data (i.e., equal to the ul-DataSplitThreshold) in the primary RLC entity.

In a conventional communication system (e.g., a long term evolution (LTE) system), the following applies to all RLC entity types (i.e., transparent mode (TM), unacknowledged mode (UM) and acknowledged mode (AM) RLC entity):

RLC service data units (SDUs) of variable sizes which are byte aligned (i.e., a multiple of 8 bits) are supported;

RLC PDUs are formed only when a transmission opportunity has been notified by a lower layer (i.e., by a medium access control (MAC) layer) and are then delivered to the lower layer.

In an embodiment of the present disclosure, each RLC SDU is used to construct an RLC PDU without waiting for notification from a lower layer (i.e., by the MAC layer) of a transmission opportunity. In the case of UM and AM RLC entities, an RLC SDU may be segmented and transported using two or more RLC PDUs based on notification(s) from the lower layer. The RLC PDUs are submitted to the lower layer only when a transmission opportunity has been notified by the lower layer (i.e., by the MAC layer).

Therefore, in a conventional communication system, RLC and MAC PDUs are generated after reception of a UL grant. In addition, in a system in accordance with an embodiment of the disclosure, there is no need to receive a UL grant and a pre-processing procedure of both RLC and the MAC layers is possible. The pre-processing procedure may include a split of UL data, and a submission of split data to the primary RLC (or MAC) entity and/or the secondary RLC (or MAC) entity before receiving a UL grant.

In an embodiment, since there is no dependency on a UL grant, implementation must take into account channel efficiency and network parameters to determine an optimum split ratio for the primary RLC entity and the secondary RLC entity.

FIG. 1 illustrates a system for evaluating a primary RLC entity and a secondary RLC entity using a previous evaluation, in accordance with an embodiment.

Referring to FIG. 1, the system may check pending data in an uplink at a UE. Here, the system may be referred to as a PDCP layer of a mobile terminal. Further, the system may compare pending data to a ul-DataSplitThreshold. If the pending data is found to be greater than the ul-DataSplitThreshold, then the system may evaluate at least one network parameter on the current RLC entity 101. The start of the evaluation is shown as reference 103. Further, the system may route all data on the secondary RLC entity for a pre-determined duration. The duration for routing may be either static or configurable. The system may evaluate the at least one network parameter on the secondary RLC entity in the above duration 105. The system may periodically evaluate both the primary RLC entity and the secondary RLC entity in a single evaluation window. The system may either determine a split factor for uplink data without considering certain data types or determine the split factor of uplink data by considering a pending data type and then evaluate the required network parameters 107. The system may determine the pending data type using buffer occupancy (BO) statistics, data arrival statistics and latency requirements. Table 1 below shows a list of different data types and network type preferences based on the BO, data arrival and latency requirement. The system may also determine favourable network parameters and configurations (i.e., a network type) to service the pending type of data. The system may estimate the network type of both the primary RLC entity and the secondary RLC entity using the previous evaluation window. The system may determine the split factor based on the network type requirement of both the primary RLC entity and the secondary RLC entity using the parameters from the previous evaluation window. The system may determine the actual split ratio between both the primary RLC entity and the secondary RLC entity using lookup tables and based on the calculated split factor. The calculation of split ratio and the lookup tables are described below in greater detail.

TABLE 1

| Buffer Occupancy | Data Arrival | Latency | Data Type | Network (NW) Type Preference (numerology, grants) |
|---|---|---|---|---|
| Low | Medium/High | Low | Frequent + Urgent small Data | Frequent Grants, High Sub Carrier Spacing (SCS) |
| Low | Medium/High | No latency requirement | Frequent + small Data | Frequent small grants or infrequent medium grants |
| Low | Low | Low | Infrequent + Urgent small data | High SCS Low latency history (Grants, low SR periodicity, SR to grant reception history) |
| Low | Low | No latency requirement | Infrequent + small data | Carrier with any SCS (as available) or Carrier with less frequent grants |
| Medium/High | Medium/High | Low | Frequent + Urgent medium/high data | High efficiency channel Frequent grants expected and high RBs |
| Medium/High | Medium/High | No latency requirement | Frequent + medium/high data | Frequent grants or Medium grants Scheduling Rate or/and Number of RBs |

TABLE 1-continued

| Buffer Occupancy | Data Arrival | Latency | Data Type | Network (NW) Type Preference (numerology, grants) |
|---|---|---|---|---|
| Medium/ High | Low | Low | Infrequent + Urgent medium/high data | High SCS numerology preferred for Tx to reduce latency Carrier with low latency history (configured grant, low SR periodicity, SR to grant reception history) preferred |
| Medium/ High | Low | No latency requirement | Infrequent + medium/high data | Carrier with any SCS (as available) or Carrier with less frequent grant |

Figure 2:
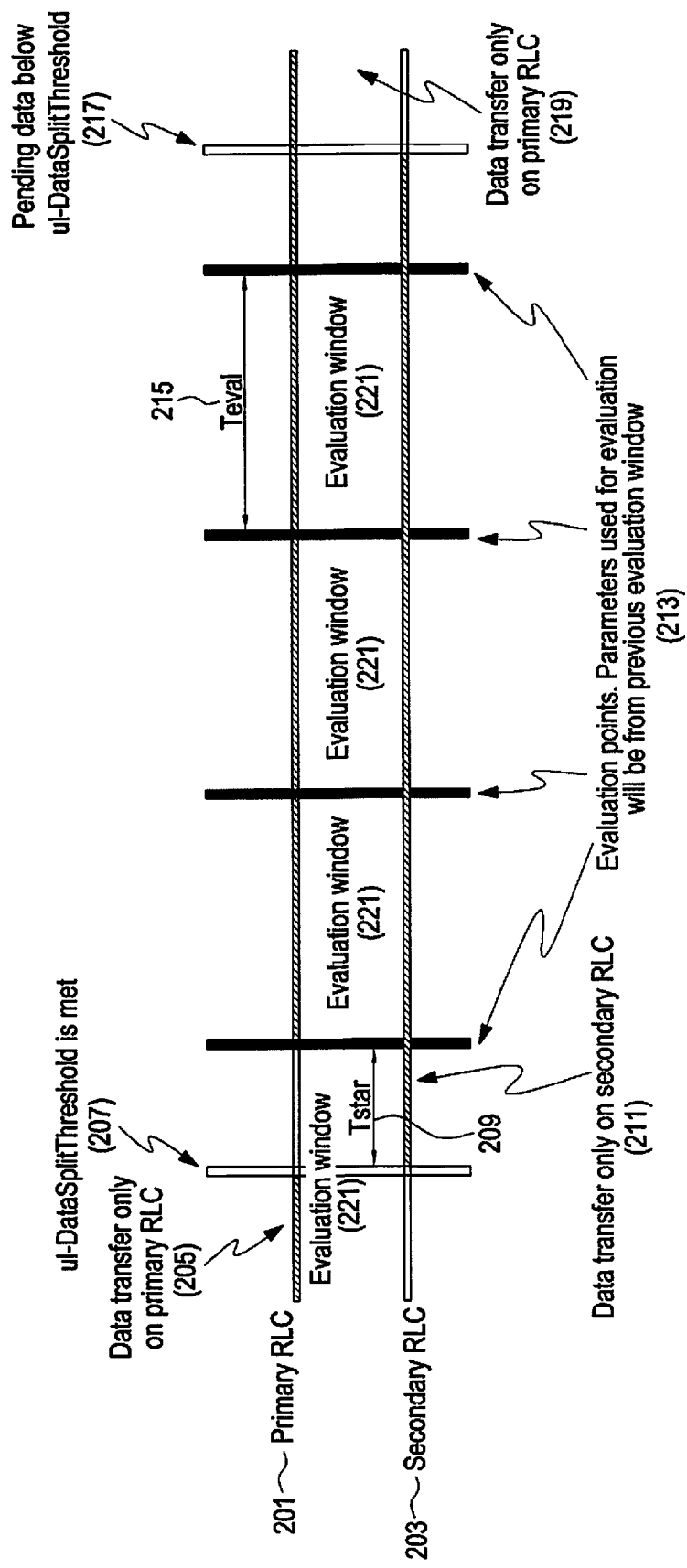
FIG. 2 illustrates a system for evaluating a primary RLC entity and a secondary RLC entity, in accordance with an embodiment.

FIG. 2 illustrates a system for evaluating a primary RLC entity and a secondary RLC entity, in accordance with an embodiment.

Referring to FIG. 2, initially, a data transfer may only be on the primary RLC entity 201, shown by reference 205. During the evaluation period 221, the data transfer may be moved from the primary RLC entity 201 to the secondary RLC entity 203, shown by reference 211. The time duration for evaluating the primary window may be represented as Teval 215. When a criteria for a ul-DataSplitThreshold is met 207, for the next Tstar 209 (which, for example, is preferably half of Teval 215), the data transfer may be moved to the secondary RLC entity 203, shown as reference 211. At the evaluation point 213, the system (i.e., a PDCP layer of a mobile terminal) may use all the parameters from the previous evaluation window 221. After the evaluation, the system may split the data accordingly between the primary RLC entity 201 and the secondary RLC entity 203, until the next evaluation point 213 or until the pending data goes below the ul-DataSplitThreshold 217.

When data available for transmission at the PDCP is greater than the ul-DataSplitThreshold during current Teval 215, the PDCP may send all the data over the primary RLC entity 201, until the ul-DataSplitThreshold is met. Teval 215 represents the time duration of each evaluation window 221. Once the ul-DataSplitThreshold is met, the PDCP may submits all PDUs to the secondary RLC entity 203. This may be performed in order to have an initial evaluation result available on the secondary RLC entity 203, which may be used later to filter the evaluation result performed over Teval 215.

When data available for transmission at the PDCP is greater than the ul-DataSplitThreshold from the beginning of current Teval 215, the PDCP may perform periodic evaluation of channels on both the uplink paths (RLC entities) based on certain parameters and may split the data between the primary RLC entity 201 and the secondary RLC entity 203 based on the evaluation. The evaluation result from each Teval 215 may be filtered using the values from the current Teval 215 window and from some parameters from the previous Teval 215. Further, the evaluation result may determine the amount of data to be split between the primary RLC entity 201 and the secondary RLC entity 203 until the next Teval 215. Every evaluation of the channels may determine a ratio "X" on which is based the data split between the primary RLC entity 201 and the secondary RLC entity 203 for transmission. The system (i.e. the PDCP layer of the mobile terminal) estimates the ratio using the formula $$X = \frac{fn(\text{parameter from primary } RLC \text{ entity})}{fn(\text{parameters from secondary } RLC \text{ entity})}.$$

The ratio X may be estimated either by sharing all the required parameters to the PDCP and the PDCP may calculate the achievable efficiency or lower layers may calculate the achievable spectral efficiency and share the spectral frequency with the PDCP.

The system may check if the total amount of PDCP data volume and the RLC data volume pending for the transmission is greater than the ul-DataSplitThreshold. If the total amount of PDCP data volume and the RLC data volume pending for the transmission is greater than the ul-DataSplitThreshold, then the system (i.e. the PDCP layer of the mobile terminal) may push all the pending data in the PDCP over the secondary RLC entity 203 for t/2 duration. The evaluation may start after the t/2 duration. The evaluation may be performed for every "t" duration as soon as the evaluation begins. At any point, the evaluation may be based on the parameters from the previous evaluation time until the current time. If the window duration is more than "t", the evaluation window 221 may be estimated by subtracting the current evaluation point from the "t" duration. A UE may find a split ratio based on various parameters between the primary RLC entity 201 and the secondary RLC entity 203. Based on the above split ratio, data may be split based on a lookup table as in Table 2 shown below and may be forwarded to the primary RLC buffer and secondary RLC buffer (described below in greater detail with reference to FIG. 4). From the primary RLC buffer and the secondary RLC buffer, data may be further split and may be forwarded to other buffers based on multiple parameters such as uplink block error ratio (UL BLER). Once the decision of splitting data is final, the pending data in the primary RLC buffer and the secondary RLC buffer may be forwarded to the respective primary RLC entity 201 and the secondary RLC entity 203.

TABLE 2

For better leg: [100 − ('X'*0.5*100)]%
For other leg: ['X'*0.5*100]%

Below is the illustration of % split between primary and secondary.
Example:
X = 0.7

Better Leg: [100 − (0.7*0.5*100)]% = 65%
Other Leg: [0.7*0.5*100]% = 35%
X = 0.76

Better Leg: [100 − (0.76*0.5*100)]% = 62%
Other Leg: [0.76*0.5*100]% = 38%
Some examples below:

TABLE 2-continued

For better leg: [100 − ('X'*0.5*100)]%
For other leg: ['X'*0.5*100]%

| Look-Up Table - 1 | | | Look-Up Table - 2 | | |
|---|---|---|---|---|---|
| Ratio 'X' | Primary (%) | Secondary (%) | Ratio 'X' | Primary (%) | Secondary (%) |
| 0.0 | 0 | 100 | 0.0 | 100 | 0 |
| 0.1 | 5 | 95 | 0.1 | 95 | 5 |
| 0.2 | 10 | 90 | 0.2 | 90 | 10 |
| 0.3 | 15 | 85 | 0.3 | 85 | 15 |
| 0.4 | 20 | 80 | 0.4 | 80 | 20 |
| 0.5 | 25 | 75 | 0.5 | 75 | 25 |
| 0.6 | 30 | 70 | 0.6 | 70 | 30 |
| 0.7 | 35 | 65 | 0.7 | 65 | 35 |
| 0.8 | 40 | 60 | 0.8 | 60 | 40 |
| 0.9 | 45 | 55 | 0.9 | 55 | 45 |
| 1.0 | 50 | 50 | 1.0 | 50 | 50 |

Figure 3:
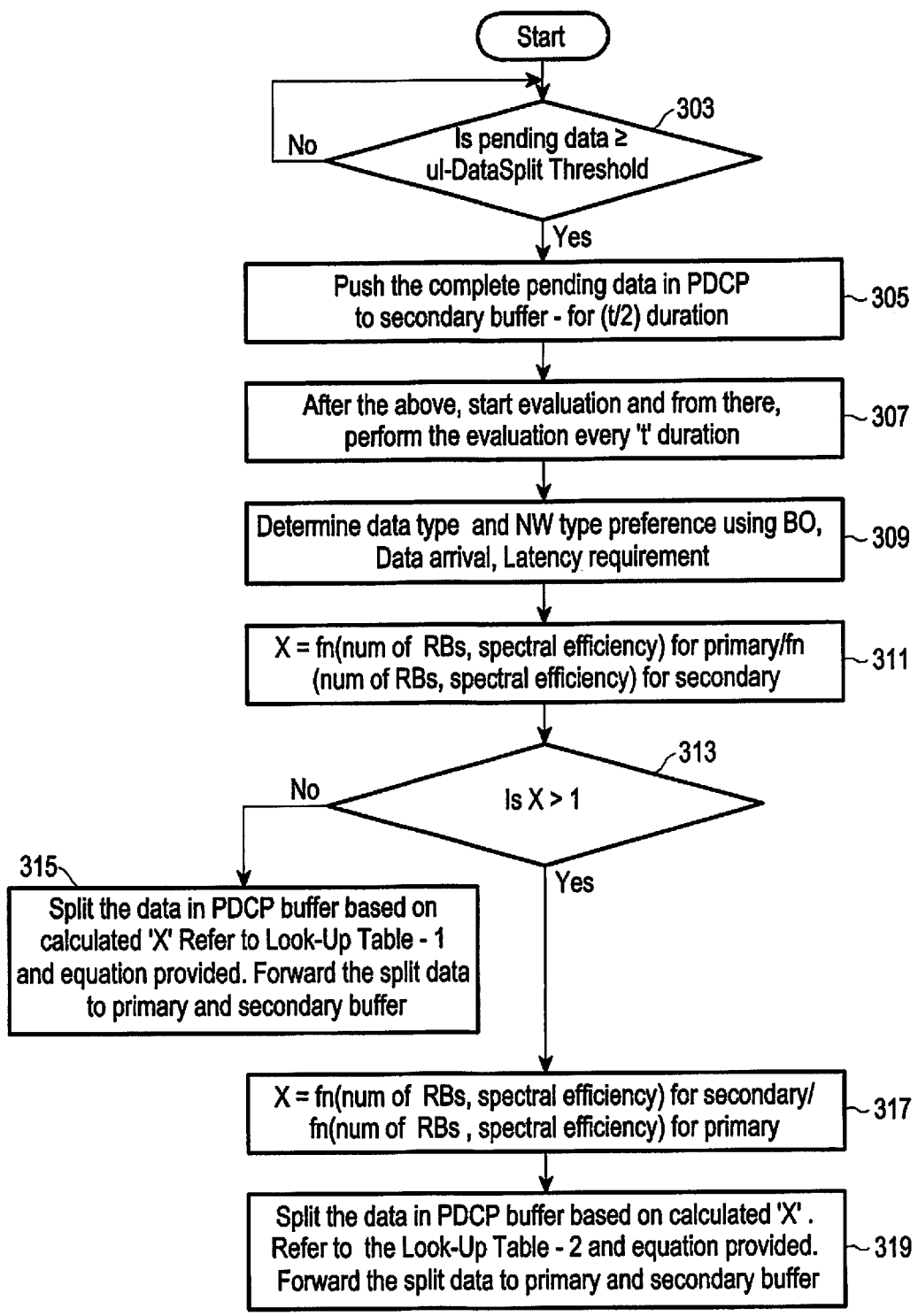
FIG. 3 is a flowchart of a method for handling uplink bearer split configurations in multi-connectivity systems, in accordance with an embodiment.

FIG. 3 is a flowchart of a method of handling uplink bearer split configurations in multi-connectivity systems, in accordance with an embodiment.

Referring to FIG. 3, at step 303, a PDCP layer of a mobile terminal checks if the pending data is greater than or equal to a ul-DataSplitThreshold. If yes, at step 305, the PDCP layer of the mobile terminal pushes the complete pending data in the PDCP to a secondary buffer for (t/2) duration. At step 307, the PDCP layer starts evaluation and performs the evaluation for every "t" duration. At step 309, the system determines the data type and network type preference using BO statistics, data arrival statistics, latency requirement. Table 1 shown above shows a list of different data types and network type preferences based on the BO statistics, data arrival statistics, latency requirement. At step 311 the PDCP layer evaluates a ratio X for each evaluation. The system estimates the ratio $$X = \frac{fn(\text{parameter from primary } RLC \text{ entity})}{fn(\text{parameters from secondary } RLC \text{ entity})}$$

as shown in Look-Up Table—1 of Table 2 shown above. At step 313, the PDCP layer estimates if the ratio value is greater than 1. If the ratio value is not greater than 1, at step 315, the PDCP layer splits the data in the PDCP buffer based on the calculated "X" and forwards the split data to the primary buffer and the secondary buffer. If the ratio value is greater than 1, at step 317, the PDCP layer estimates the ratio $$X = \frac{fn(\text{parameter from secondary } RLC \text{ entity})}{fn(\text{parameters from primary } RLC \text{ entity})}.$$

At step 319, the system splits the data in the PDCP buffer based on the calculated "X" in the Look Up Table—2 of Table 2 shown above and forwards the split data to the primary buffer and the secondary buffer.

Figure 4:
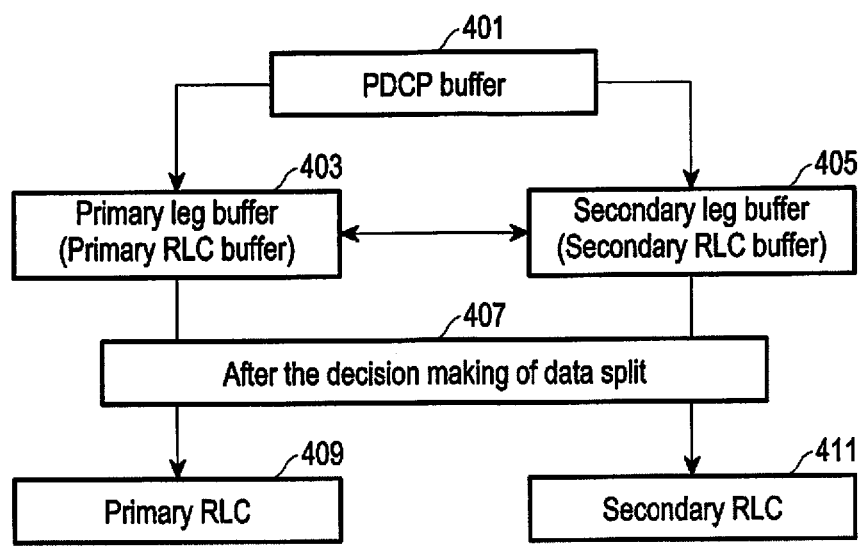
FIG. 4 is a flow diagram of buffer management, in accordance with an embodiment.

FIG. 4 is a flow diagram of buffer management, in accordance with an embodiment.

Referring to FIG. 4, the buffer management includes a PDCP buffer 401, a primary leg buffer 403, a secondary leg buffer 405, a primary RLC entity 409 and a secondary RLC entity 411. When data is split according to the Look-Up Table—1 or/and the Look-Up Table—2 in Table 2 shown above based on the ratio described in Table 2 shown above, split data is forwarded to the primary leg buffer 403 and the secondary leg buffer 405. From the primary leg buffer 403 and the secondary leg buffer 405, data may be further split and may be forwarded to other buffers based on multiple parameters such as UL BLER. Once the decision of splitting data is final, shown as reference 407, the pending data in the primary leg buffer 403 and the secondary leg buffer 405 is forwarded to the respective primary RLC entity 409 and secondary RLC entity 411.

Figure 5:
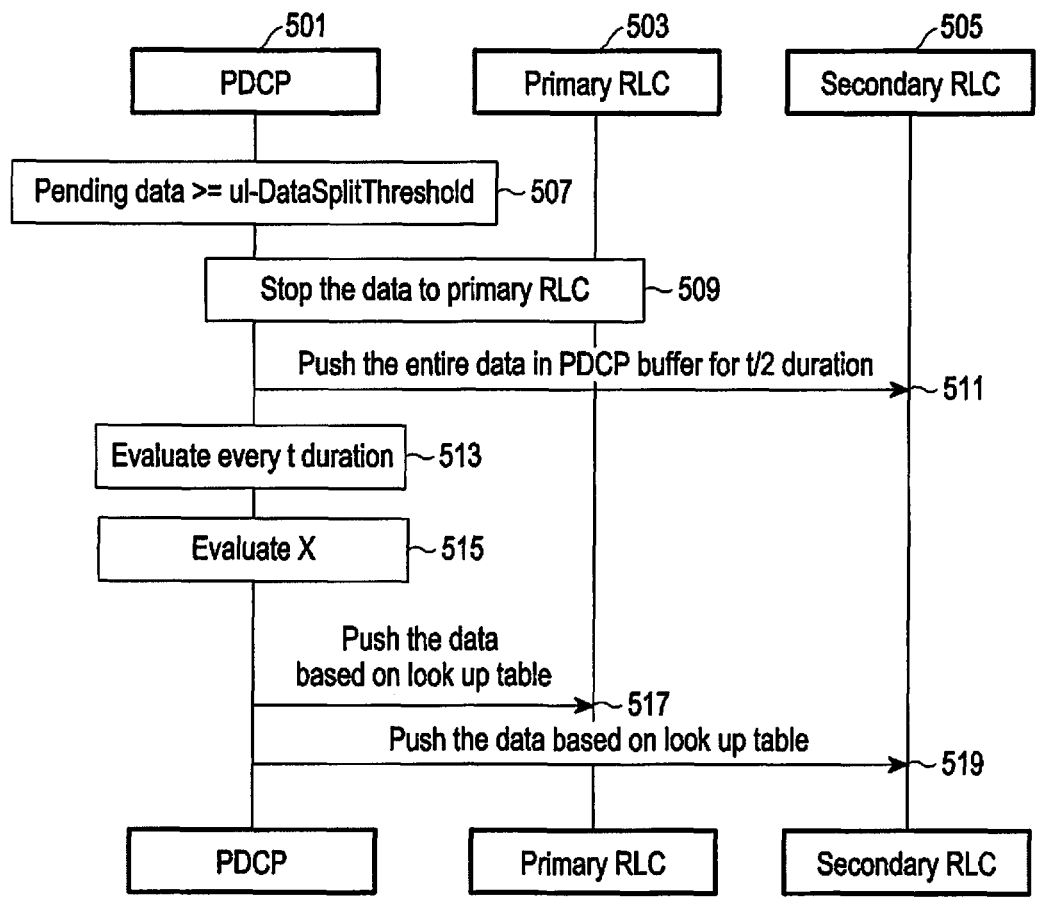
FIG. 5 is a timing diagram for splitting data based on an evaluation, in accordance with an embodiment.

FIG. 5 is a timing diagram of a method for splitting data based on an evaluation, in accordance with an embodiment.

Referring to FIG. 5, when a PDCP activation is triggered and when pending data is greater than or equal to that of a ul-DataSplitThreshold, in step 507, a PDCP layer 501 of a mobile terminal pauses the data to the primary RLC entity 503, in step 509 and pushes the entire data in the PDCP buffer for t/2 duration, in step 511. The PDCP layer 501 evaluates the primary RLC entity 503 and the secondary RLC entity 505 for every T duration, in step 513. Further, the PDCP layer 501 evaluates a ratio X based on the formula depicted in Look-Up Table—1 of Table 2 shown above, in step 515. The PDCP layer 501 pushes the pending data based on the value of the Look-Up Table—1 in Table 2 shown above from the PDCP to the primary RLC entity 503, in step 517. Similarly, the PDCP layer 501 pushes the pending data from the PDCP to the secondary RLC entity 505 based on the Look-Up Table—2 in Table 2 shown above, in step 519.

Figure 6:
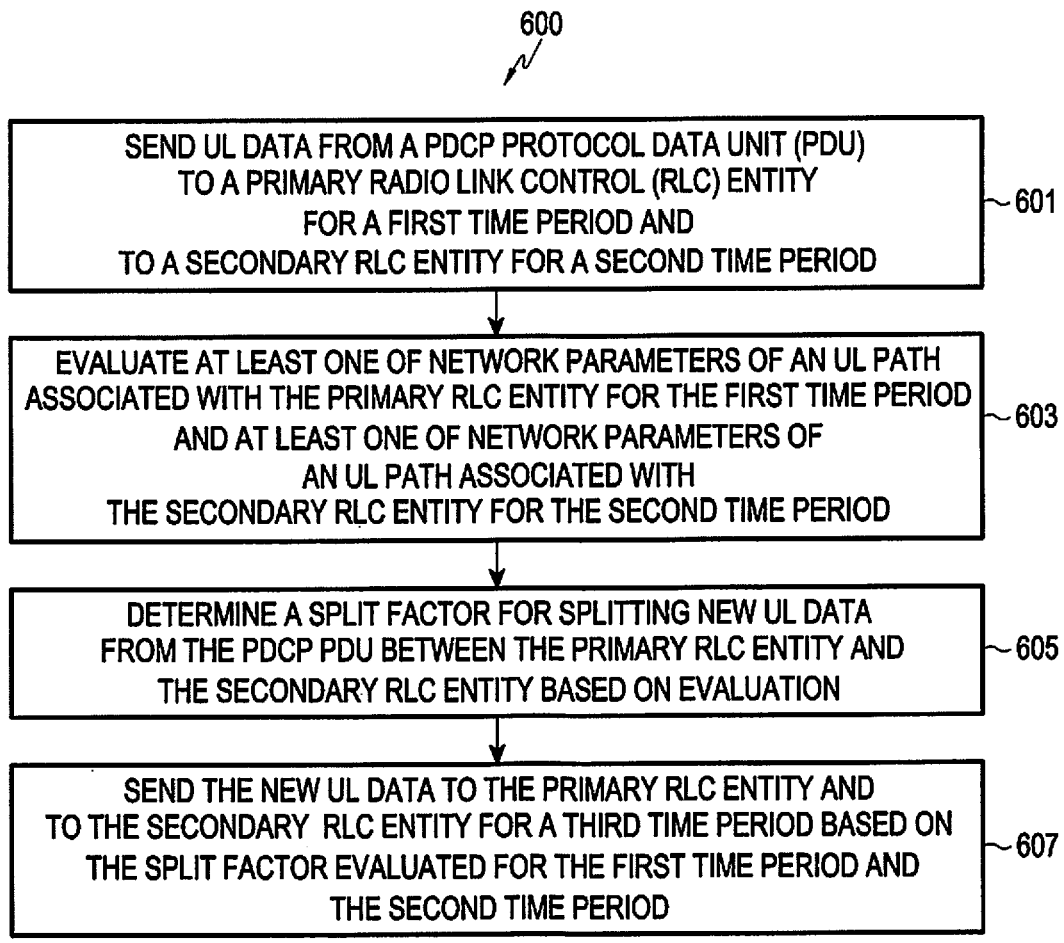
FIG. 6 is a flowchart of a method for handling uplink bearer split configuration in a dual connectivity technology for long term evolution-NR cellular networks, in accordance with an embodiment.

FIG. 6 is a flowchart of a method 600 for handling UL bearer split configuration in a dual connectivity (DC) technology for LTE-NR cellular networks, in accordance with an embodiment.

Referring to FIG. 6, the method 600 includes one or more steps for handling uplink bearer split configurations in dual connectivity systems. The method 600 may be described in the general context of computer executable instructions. Generally, computer executable instructions may include routines, programs, objects, components, data structures, procedures, modules, and functions, which perform particular functions or implement particular abstract data types.

The order in which the method 600 is described is not intended to be construed as a limitation, and any number of the described method steps may be combined in any order to implement the method 600. Additionally, individual steps may be deleted from the method 600 without departing from the scope of the present disclosure. Furthermore, the method 600 may be implemented in any suitable hardware, software, firmware, or combination thereof.

At step 601, a PDCP layer of a mobile terminal sends UL data from a PDCP PDU to a primary RLC entity for a first time period and to a secondary RLC entity for a second time period. Here, the first time period is one of equal to, greater than and less than the second time period. In addition, when the UL data is greater than or equal to a UL data split threshold, the PDCP layer of the mobile terminal sends remaining data of the UL data from the PDCP PDU to the secondary RLC entity for the second time period.

At step 603, the PDCP layer of the mobile terminal evaluates at least one of network parameters of a UL path associated with the primary RLC entity for the first time period and the network parameters of a UL path associated with the secondary RLC for the second time period. The network parameters include at least one of spectrum efficiency (SE), UL block error rate (BER), BO statistics, amount of data arrival, latency, PDCP PDU data type, number of uplink grants allocated, scheduling rate and subcarrier spacing (SCS). The network parameters are provided by at least one of a physical (PHY) layer and a MAC layer to the PDCP layer. Furthermore, the at least one of PHY layer and MAC layer calculates the spectral efficiency, and the at least one of PHY layer and MAC layer shares the calculated spectral efficiency with the PDCP layer.

At step 605, the PDCP layer of the mobile terminal determines a split factor for splitting new UL data from the PDCP PDU between the primary RLC entity and the secondary RLC based on the evaluation performed in step 503. The new UL data refers to a future UL data or an upcoming UL data. Here, a lookup table is referred based on the split factor for determining a split ratio between the primary RLC entity and the secondary RLC entity.

At step 607, the PDCP layer of the mobile terminal sends the new UL data to the primary RLC entity and to the secondary RLC entity for a third time period based on the split factor evaluated for the first time period and the second time period. Here, the third time period is equal to a summation of the first time period and the second time period.

The advantages of the present disclosure are listed below.

The present disclosure provides a user equipment specific solution and better uplink performance when supplementary uplink is not supported (for high frequency bands), especially, towards a cell edge area.

The present disclosure provides better uplink performance when one of a dual connectivity RLC entity is loaded at a network side as compared to another RLC entity.

The present disclosure provides better uplink performance when one of a dual connectivity RLC entity is facing more errors in uplink as compared to another RLC entity.

The present disclosure eliminates side effects at a user equipment side as well as on a network side. This implementation does not have any side effects like in the case of 50% split (low UL data rate if one leg is poor) or as in the implementation of transmitting data up to a threshold in a primary leg and remaining data in a secondary leg (low UL data rate if the leg which has more data is poor).

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The described operations may be implemented as a method, system or article of manufacture using standard programming and/or engineering techniques to produce software, firmware, hardware, or any combination thereof. The described operations may be implemented as code maintained in a non-transitory computer readable medium, where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (compact disc read only memories (CD-ROMs), digital versatile discs (DVDs), optical disks, etc.), volatile and non-volatile memory devices (e.g., electrically erasable programmable read only memories (EEPROMs), ROMs, programmable ROMs (PROMs), random access memories (RAMs), dynamic RAMs (DRAMs), static RAMs (SRAMs), flash memory, firmware, programmable logic, etc.), etc. Further, non-transitory computer-readable media include all computer-readable media except for a transitory computer-readable media. Code implementing the described operations may further be implemented in hardware logic (e.g., an integrated circuit chip, a programmable gate array (PGA), an application specific integrated circuit (ASIC), etc.).

The terms "an embodiment", "embodiment", "embodiments", "the embodiment", "the embodiments", "one or more embodiments", "some embodiments", and "one embodiment" indicate "one or more (but not all) embodiments of the disclosure unless expressly specified otherwise.

The terms "including", "comprising", "having" and variations thereof indicate "including but not limited to", unless expressly specified otherwise.

The enumerated listing of items does not imply that any or all of the items are mutually exclusive, unless expressly specified otherwise.

The terms "a", "an" and "the" indicate "one or more", unless expressly specified otherwise.

A description of an embodiment with several components in communication with each other does not imply that all such components are required. On the contrary, a variety of optional components are described to illustrate the wide variety of possible embodiments of the disclosure.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present disclosure need not include the device itself.

The illustrated steps of FIGS. 3 and 6 show certain events occurring in a certain order. In alternative embodiments, certain steps may be performed in a different order, modified or removed. Moreover, steps may be added to the above described logic and still conform to the present disclosure. Further, steps described herein may occur sequentially or certain steps may be processed in parallel. Yet further, steps may be performed by a single processing unit or by distributed processing units.

Finally, the language used in the disclosure has been principally selected for readability and instructional purposes, but may not have been selected to delineate or circumscribe the disclosure. It is therefore intended that the scope of the disclosure is not limited by this detailed description, but rather by the appended claims and their equivalents. Accordingly, the disclosure is intended to be illustrative, but not limiting, of the scope of the disclosure, as defined by the appended claims and their equivalents.

While various aspects and embodiments have been disclosed herein, other aspects and embodiments will be apparent to those skilled in the art. The various aspects and embodiments disclosed herein are for purposes of illustration and are not intended to be limiting, with the scope and spirit being indicated by the appended claims and their equivalents.

What is claimed is:

1. A method for handling an uplink (UL) bearer split configuration in a multi-connectivity system, the method comprising:
    identifying, by a mobile terminal, first UL data of a packet data convergence protocol (PDCP) layer;

transmitting, by the mobile terminal, first data of the first UL data to a primary radio link control (RLC) entity for a first time period, and transmitting second data of the first UL data to a secondary RLC entity for a second time period;

identifying, by the mobile terminal, at least one first network parameter of a first UL path associated with the primary RLC entity for the first time period, and identifying at least one second network parameter of a second UL path associated with the secondary RLC entity for the second time period;

irrespective of reception of an UL grant for second UL data of the PDCP layer, determining, by the mobile terminal, a split factor for splitting the second UL data between the primary RLC entity and the secondary RLC entity based on the at least one first network parameter and the at least one second network parameter; and transmitting, by the mobile terminal, the second UL data to the primary RLC entity and the secondary RLC entity for a third time period based on the split factor.

2. The method of claim 1, wherein the first time period comprises a same or a different time period as the second time period, and wherein the third time period comprises a sum of the first time period and the second time period.

3. The method of claim 1, wherein the at least one first network parameter comprises at least one of a spectrum efficiency (SE) of the first UL path, a block error rate (BER) of the first UL path, buffer occupancy (BO) statistics related to the first UL path, an amount of data arrival related to the first UL path, a latency related to the first UL path, a PDCP protocol data unit (PDU) data type on the first UL path, a number of uplink grants allocated for the first UL path, a scheduling rate related to the first UL path, and a subcarrier spacing (SCS) related to the first UL path, and wherein the at least one second network parameter comprises at least one of an SE of the second UL path, a BER of the second UL path, BO statistics related to the second UL path, an amount of data arrival related to the second UL path, a latency related to the second UL path, a PDCP PDU data type on the second UL path, a number of uplink grants allocated for the second UL path, a scheduling rate related to the first UL path, and an SCS related to the second UL path.

4. The method of claim 1, wherein the at least one network parameter of the first UL path and the at least one network parameter of the second UL path are provided by at least one of a physical (PHY) layer and a medium access control (MAC) layer to the PDCP layer.

5. The method of claim 4, further comprising calculating, by the at least one of the PHY layer and the MAC layer, a spectral efficiency for each of the first UL path and the second UL path, and sharing, by the at least one of the PHY layer and the MAC layer, the spectral efficiency for each of the first UL path and the second UL path with the PDCP layer.

6. The method of claim 1, wherein the first UL data is greater than or equal to a UL data split threshold, and the second data is remaining data except the first data transmitted during the first time period from the first UL data.

7. The method of claim 1, further comprising determining the split factor based on a lookup table for determining a split ratio between the primary RLC entity and the secondary RLC entity.

8. A mobile terminal for handling an uplink (UL) bearer split configuration, comprising:

a transceiver;

at least one processor; and a memory communicatively coupled to the at least one processor, wherein the memory is configured to store processor-executable instructions, which, when executed, cause the at least one processor to:

identify first UL data of a packet data convergence protocol (PDCP) layer;

control the transceiver to transmit first data of the first UL data to a primary radio link control (RLC) entity for a first time period, and to transmit second data of the first UL data to a secondary RLC entity for a second time period;

identify at least one first network parameter of a first UL path associated with the primary RLC entity for the first time period, and identify at least one second network parameter of a second UL path associated with the secondary RLC entity for the second time period;

irrespective of reception of an UL grant for second UL data of the PDCP layer, determine a split factor for splitting the second UL data between the primary RLC entity and the secondary RLC entity based on the at least one first network parameter and the at least one second network parameter; and control the transceiver to transmit the second UL data to the primary RLC entity and the secondary RLC entity for a third time period based on the split factor.

9. The mobile terminal of claim 8, wherein the first time period comprises a same or a different time period as the second time period, and wherein the third time period comprises a sum of the first time period and the second time period.

10. The mobile terminal of claim 8, wherein the at least one first network parameter comprises at least one of a spectrum efficiency (SE) of the first UL path, a block error rate (BER) of the first UL path, buffer occupancy (BO) statistics related to the first UL path, an amount of data arrival related to the first UL path, a latency related to the first UL path, a PDCP protocol data unit (PDU) data type on the first UL path, a number of uplink grants allocated for the first UL path, a scheduling rate related to the first UL path, and a subcarrier spacing (SCS) related to the first UL path, and wherein the at least one second network parameter comprises at least one of an SE of the second UL path, a BER of the second UL path, BO statistics related to the second UL path, an amount of data arrival related to the second UL path, a latency related to the second UL path, a PDCP PDU data type on the second UL path, a number of uplink grants allocated for the second UL path, a scheduling rate related to the first UL path, and an SCS related to the second UL path.

11. The mobile terminal of claim 8, wherein the at least one network parameter of the first UL path and the at least one network parameter of the second UL path are provided by at least one of a physical (PHY) layer and a medium access control (MAC) layer to the PDCP layer.

12. The mobile terminal of claim 8, wherein the memory is further configured to store processor-executable instructions, which, when executed, cause the at least one processor to calculate, by the at least one of the PHY layer and the MAC layer, a spectral efficiency for each of the first UL path and the second UL path, and wherein share, by the at least one of the PHY layer and the MAC layer, the spectral efficiency for each of the first UL path and the second UL path with the PDCP layer.

13. The mobile terminal of claim 8, wherein the first UL data is greater than or equal to a UL data split threshold, and the second data is remaining data except the first data transmitted during the first time period from the first UL data.

14. The mobile terminal of claim 8, wherein the memory is further configured to store processor-executable instructions, which, when executed, cause the at least one processor to determine the split factor based on a lookup table for determining a split ratio between the primary RLC entity and the secondary RLC entity.

15. A non-transitory computer readable medium comprising instructions stored thereon which, when processed by at least one processor, cause a mobile terminal to perform a method comprising:
    identifying first uplink (UL) data of a packet data convergence protocol (PDCP) layer;
    transmitting first data of the first UL data to a primary radio link control (RLC) entity for a first time period, and transmitting second data of the first UL data to a secondary RLC entity for a second time period;
    identifying at least one first network parameter of a first UL path associated with the primary RLC entity for the first time period, and identifying at least one second network parameter of a second UL path associated with the secondary RLC entity for the second time period;
    irrespective of reception of an UL grant for second UL data of the PDCP layer, determining a split factor for splitting the second UL data between the primary RLC entity and the secondary RLC entity based on the at least one first network parameter and the at least one second network parameter; and
    transmitting the second UL data to the primary RLC entity and the secondary RLC entity for a third time period based on the split factor.

16. The medium of claim 15, wherein the first time period comprises a same or a different time period as the second time period, and
    wherein the third time period comprises a sum of the first time period and the second time period.

17. The medium of claim 15, wherein the first UL data is greater than or equal to a UL data split threshold, and the second data is remaining data except the first data transmitted during the first time period from the first UL data.

18. The medium of claim 15, wherein the at least one first network parameter comprises at least one of a spectrum efficiency (SE) of the first UL path, a block error rate (BER) of the first UL path, buffer occupancy (BO) statistics related to the first UL path, an amount of data arrival related to the first UL path, a latency related to the first UL path, a PDCP protocol data unit (PDU) data type on the first UL path, a number of uplink grants allocated for the first UL path, a scheduling rate related to the first UL path, and a subcarrier spacing (SCS) related to the first UL path, and
    wherein the at least one second network parameter comprises at least one of an SE of the second UL path, a BER of the second UL path, BO statistics related to the second UL path, an amount of data arrival related to the second UL path, a latency related to the second UL path, a PDCP PDU data type on the second UL path, a number of uplink grants allocated for the second UL path, a scheduling rate related to the first UL path, and an SCS related to the second UL path.

* * * * *